United States Patent

Lewis

[11] Patent Number: 5,984,370
[45] Date of Patent: Nov. 16, 1999

[54] CORROSION BARRIER WITH ANTIBACTERIAL PROTECTION FOR PIPE CONNECTIONS

[76] Inventor: John K. Lewis, 14006 Blazey Dr., Houston, Tex. 77095-3434

[21] Appl. No.: 08/906,294

[22] Filed: Aug. 5, 1997

[51] Int. Cl.⁶ .................................................. F16L 13/02
[52] U.S. Cl. .......................... 285/22; 285/288.1; 285/370
[58] Field of Search ........................ 285/22, 22.1, 288.1, 285/287.1, 370

[56] References Cited

U.S. PATENT DOCUMENTS

| | | | |
|---|---|---|---|
| 2,156,604 | 5/1939 | Payne et al. | 285/287.1 |
| 2,366,579 | 1/1945 | Von Ahrens . | |
| 2,764,426 | 9/1956 | Von Ahrens . | |
| 2,814,508 | 11/1957 | Seamark . | |
| 2,915,110 | 12/1959 | Ferguson et al. | 285/287.1 |
| 3,076,261 | 2/1963 | Christensen . | |
| 3,165,082 | 1/1965 | Baker . | |
| 3,224,797 | 12/1965 | Hausmann | 285/370 |
| 3,224,798 | 12/1965 | Hausmann | 285/370 |
| 3,508,766 | 4/1970 | Kessler et al. . | |
| 3,961,814 | 6/1976 | Byrne et al. . | |
| 4,257,630 | 3/1981 | Bartell et al. . | |
| 4,432,759 | 2/1984 | Gross et al. | 285/419 |
| 4,619,470 | 10/1986 | Overath et al. . | |
| 4,786,089 | 11/1988 | McConnell . | |
| 4,811,975 | 3/1989 | Paul, Jr. et al. . | |
| 4,913,465 | 4/1990 | Abbema et al. . | |
| 5,096,206 | 3/1992 | Andre et al. | 285/287.1 |
| 5,131,694 | 7/1992 | Portis . | |
| 5,219,187 | 6/1993 | Mikitka . | |
| 5,346,261 | 9/1994 | Abbema . | |
| 5,536,258 | 7/1996 | Folden | 604/905 |
| 5,547,228 | 8/1996 | Abbema et al. . | |
| 5,566,984 | 10/1996 | Abbema et al. . | |

FOREIGN PATENT DOCUMENTS

| | | |
|---|---|---|
| 1293983 | 4/1962 | France . |
| 6173372 | 12/1967 | Netherlands . |

*Primary Examiner*—Eric K. Nicholson
*Attorney, Agent, or Firm*—Jeffrey L. Streets

[57] ABSTRACT

A corrosion resistant sleeve joining abutted ends of lined pipe where corrosive or erosive gases, fluids or slurries may flow to provide a continuous corrosion barrier between the ends of adjacent pipe liners. The sleeve is preferably a cylindrical member having sufficient length to allow disposition of a protective material, such as biocide, corrosion inhibitor, or combination thereof between the sleeve and the pipe surrounding the sleeve. The elongated cylindrical section may provide a double set of O-rings separated by a distance that would allow an annular recess to be placed between them for disposing a protective material. The protective material is preferably soluble with any fluid material that is to be transported through the pipe and blends with any fluid that permeates the outer most O-ring and comes into contact with the protective material. The protective material preferably blends with the fluid prior to penetration of the inner O-ring and thereby prevents damage to the metal pipe in the area between the adjacent liners.

15 Claims, 4 Drawing Sheets

CORROSION BARRIER WITH ANTIBACTERIAL PROTECTION FOR PIPE CONNECTIONS

BACKGROUND OF THE INVENTION

1. Field of the Invention

The present invention relates to the field of pipe connections. More particularly, the present invention relates to the field of welded pipe connections normally useful in the oil and gas production, refining and transportation industries and flanged pipe connections normally useful in the chemical plant industry.

2. Background of the Related Art

Corrosion barriers are useful in conjunction with pipes by joining pipes whose interior regions are coated with protective materials, such as thin polymer based coatings or cement based liners, which form a protective barrier between the pipe material and the materials passing through the pipe. In some instances, as in highly corrosive environments, the protective barrier may be constructed of a tubular PTFE or other polymer based material.

In the oil and gas transportation industry, the most common method of connecting individual lengths of pipe is by welding the ends together. Welding of the pipe ends presents several pipe material protection problems. The Cylindrical Corrosion Barrier For Pipe Connections, U.S. Pat. No. 5,547,228 and U.S. Pat. No. 5,566,984 provide for methods of solving those pipe material protection problems.

Corrosion of the pipe material caused by anaerobic and/or aerobic bacteria is another common problem within the oil and gas industries. It is common practice in the oil and gas industry to enhance the productivity of their oil and gas gathering operations to inject fluids into the ground through wells placed near the perimeter of an existing, or new, oil or gas field. The purpose of this injection is to increase the pressure of the oil or gas at the well head thereby increasing the amount of oil or gas that is available for capture by the gathering system. The most common fluid injected into these wells would be water with a high saline content. Some of the common types of this type of water would be known as brine or sea water. Other types of fluids may be injected for this purpose. Some may have other types of ingredients mixed with the water such as specially designed polymers.

When the oil and/or gas is brought to the surface by using this injection method, some of the injection fluid is mixed with the oil and gas. This fluid is separated from the oil and gas before transporting the oil and gas to its refining destination. This separated material is often contaminated with by-products of the oil and gas and other sub strata minerals, chemicals and materials that have dissolved and blended with the solution. It is also a normal procedure for the oil and gas industry to recover these fluids and re-inject these materials into the injection well formation. This eliminates the costly and hazardous method of treating this fluid for environmental concerns.

Often the fluids that are injected into these wells contain contaminates such as aerobic and anaerobic bacteria. These contaminants are very harmful to the unprotected areas of steel pipelines. The Cylindrical Corrosion Barrier as disclosed in the above referenced patents may effectively seal this unprotected area, as a result of the welding process, when it is installed. The product is designed to provide long term corrosion protection by preventing any fluid from penetrating the sealing design of the product. However, this protective design might not effectively protect the exposed metal surface of the pipe from attack by bacteria, specifically anaerobic bacteria, since the design is predicated upon the quick deoxygenation of the material penetrating the sealing system. Since anaerobic bacteria can survive in low oxygen or oxygen-depleted environments, there still exists a need for an apparatus to eliminate these bacterial elements before they can penetrate to the unprotected areas of the pipe. Furthermore, there exists a need for a corrosion barrier with antibacterial protection which also solves the problems of welding pipes joints.

SUMMARY OF THE INVENTION

The present invention provides a corrosion resistant sleeve which provides a continuous corrosion barrier at the connection of adjacent pipe ends where corrosive or erosive gases, fluids or slurries containing damaging bacterial or corrosive elements, flowing through the pipe, can cause corrosion. In one embodiment of the invention, the sleeve is preferably a tubular member that has been extended in length to allow a disposition of a protective material, preferably a biocide, to effectively terminate any bacterial activity before the bacteria come in contact with any unprotected steel.

In addition to the biocide, the protective material may also contain the ability to inhibit, or eliminate, the corrosion of the unprotected steel by methods other than those provided by bacterial contamination. The oil and gas industry commonly refer to these type of materials as corrosion inhibitors.

The elongated tubular section preferably provides two sets of multiple O-rings located on each end of the tubular section which provides compression between the interior of the pipe and the exterior of the protective sleeve to prevent penetration of fluid into the unprotected metal area in the vacinity of the pipe weld. Each set of O-rings is preferably separated by a distance that will allow an annular recess to be placed between the O-rings. This recess is preferably centered between the O-rings with a depth to allow a biocide or a combination biocide/inhibitor material to be placed by various methods into the recess. The material is incorporated as part of the protective sleeve which is installed inside the pipeline. The bacterial protection material is preferably soluble with any fluid material that is transported through the pipeline and blends with any fluid that permeates the outer most O-ring and comes into contact with the material. The bacterial protection material preferably blends with the bacteria prior to any penetration of the inner O-ring and thereby prevents corrosion in the area that contains unprotected metal.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
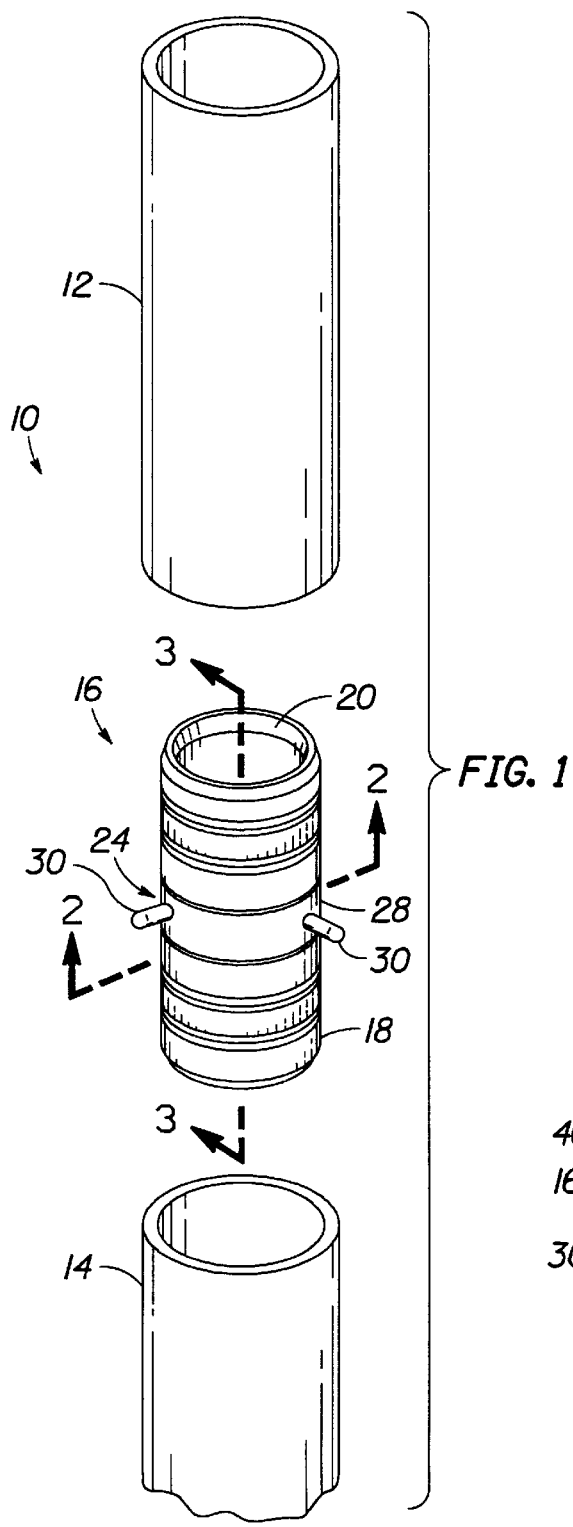
FIG. 1 is an exploded view of one embodiment of the continuous corrosion barrier of the invention.

Referring to FIG. 1, one embodiment of the continuous corrosion barrier 10 of the present invention generally includes a sleeve 16 which is received in adjacent ends 12, 14 of adjacent lengths of internally coated pipe. This embodiment of the invention is primarily useful, but not limited to, pipeline applications wherein a thin protective coating is applied to the inner diameter of the pipe and the pipe ends 12, 14 are welded together. The sleeve 16 includes a generally right cylindrical housing 18, having opposed open ends 20, 22, (end 22 shown in FIG. 3), and a central shielding portion 24, which is partially received into the pipe end 12 when one end of the sleeve 16 is fully received into the pipe end 12. The central shielding portion 24 of the sleeve 16 preferably includes a ring member 28, having three or more, preferably three to six, alignment spacers 30 circumferentially spaced thereabouts and extending outwardly therefrom. The spacers 30 are preferably attached to the ring 28 by tack welding, although other attachment means, such as forming the connection of the spacer 30 to the ring 28 as a rivet, or as a simple mechanical connection capable of being easily broken, may be provided. When the sleeve 16 is properly positioned in the pipe ends 12, 14, the pipe ends 12, 14 contact, or are in close proximity to, the spacers 30. Preferably, the spacers 30 are configured as pins, which extend outwardly from the outer diameter of the pipe, or may be configured as spherical balls.

During a welding operation, particularly a multiple pass welding operation, substantial heat is generated which will increase the temperature of the pipe ends 12, 14 above the burning or transformation temperature of the thin protective coating maintained on the interior surface of the pipe and prior art metallic sleeve. When the areas of the coating on the inside of the pipe and the on the inside of the prior art internally coated metallic sleeve are destroyed during welding, the underlying pipe material and sleeve material will be exposed to the gases or fluids which are passed through the pipe. This can cause the pipe or the sleeve to fail. Therefore, to properly protect the weld joint, the sleeve 16 must provide a barrier to prevent the materials such as fluids or gases from contacting, and then eroding and/or corroding, the exposed areas of the pipe, and also provide a non-compromised inner surface on the sleeve 16 to protect the weld and the sleeve 16 from corrosion and/or erosion from the materials passing through the pipe. The sleeve 16 of the present invention may be configured to meet both requirements.

Figure 3:
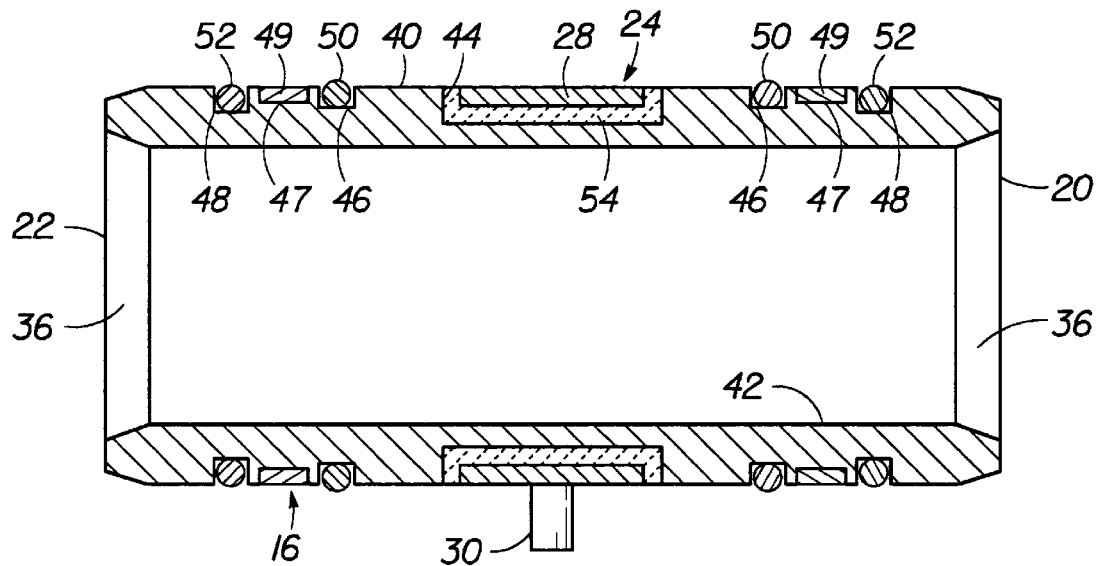
FIG. 3 is a further sectional view of the connection of FIG. 1 at section 3—3.

Referring now to FIG. 3, the embodiment of the sleeve 16 of the present invention primarily useful for weld connection of interiorly coated pipes is shown in detail. In this embodiment, the sleeve 16 is a generally tubular member, having an outer circumferential surface 40 with a diameter slightly less than the minimum inner diameter tolerance of the pipe 12, 14 into which the sleeve 16 is to be inserted. This ensures that the sleeve 16 may be inserted into any pipe end 12, 14 which is within the tolerance range for the specific pipe size. It should be appreciated that multiple sizes of sleeves 16, corresponding to the numerous available nominal pipe diameters, may be provided to cover the available ranges of pipe sizes which are connected by welding. The inner circumferential surface 42 of the sleeve has a diameter sized to allow an inspection pig, or other such pipe cleaning or flow volume separating mechanism, to pass therethrough. The ends 20, 22 of the sleeve 16 preferably include a tapered inner surface 36, extending from the ends 20, 22 of the sleeve 16 to a position interiorly of the sleeve ends 20, 22. The tapered inner surface 36 is provided to help prevent a pig or other device from engaging the end of the sleeve 16 and dislodging it, and to increase the flowability of gases and fluids through pipe.

The outer surface 40 of the sleeve 16 includes a central alignment recess 44 located at the approximate longitudinal center of the sleeve 16 in which the ring 28 is at least partially received, and a pair of seal grooves, 46, 48 extending circumferentially about the sleeve 16 on either side of the alignment recess 44. The first grooves 46 on either side of the alignment recess 44 is located equidistant either side of the alignment recess 44 and have a first depth to accommodate a first seal 50 such as an O-ring therein. The first seal 50 is preferably a high temperature seal configured from a high temperature material, such as silicone, capable of withstanding a temperature of approximately 300 degrees Fahrenheit. The second grooves 48 are positioned between the first grooves 46 and the adjacent end 20 or 22 of the pipe, and are sized at a second depth, greater than that of the first groove 46, to receive a second seal 52 such as an O-ring therein. The second seal 52 may be a buna material capable of withstanding temperatures on the order of 150 degrees Fahrenheit. The seals 50,52 preferably have the same cross section, and therefore the first seal 50 will extend further from the outer surface 40 of the sleeve 16 than will the second seal 52 prior to insertion of the sleeve 16 into the pipe end 12 or 14. If the sleeve 16 will be exposed to high pressures within the pipe, backup rings may be provided in the grooves 46, 48. These rings are preferably configured from a high temperature conformable material such as Viton. The grooves 46, 48 are spaced a sufficient distance from the weld to ensure that the temperatures at the seals 50, 52 disposed therein do not exceed the limit temperatures of the seal material therein. It has been found that if the first grooves 46 are located approximately one inch from the center of the weld and the second grooves 48 are disposed approximately two inches from the center of the weld, the seals 50, 52 will not experience temperatures exceeding the above described limits when the pipe ends 12, 14 are welded together. By providing different groove depths for grooves 46, 48, and placing O-ring seals 50, 52 therein of the same cross-section, the outer circumferences of the seals 50, 52 will span the API tolerance gap of the diameters of pipe ends 12, 14. Therefore, if the pipe end 12 is at the minimum diameter tolerance, and pipe end 14 is at the maximum diameter tolerance, then both of the seals 50, 52 on the portion of the sleeve 16 received in the pipe end 12 will seal against the inner surface of the pipe end 12, but only the seal 50 on the portion of the sleeve 16 received in pipe end 14 will seal against the inner surface thereof. However, sealing engagement of one seal to the inner pipe surface on either side of the weld is sufficient to ensure that a seal is made to prevent entry of pipe fluids and gases to the area of the weld.

To prevent corrosion caused by aerobic or anaerobic bacteria, the present invention provides for a recess 47 disposed between the first and second O-ring grooves 46 and 48. A bacterial protection material 49, such as a biocide or a combination of biocide and inhibitors, is disposed in the recess. If any fluid containing corrosion causing bacteria leaks into the area between the second seal and the first seal, the bacterial protection material 49 blends with the fluid and terminates any bacterial activity before bacteria can reach unprotected steel and cause corrosion. To enhance corrosion protection, the bacterial protection material may also contain additional corrosion inhibitors other than biocide. The bacterial protection material is preferably in a form which is soluble with any fluid material that is transported through the pipeline.

In addition to sealing the weld area of the connection 10, the sleeve 16 is configured to provide a heat shield to limit the passage of heat from the weld and into the inner diameter of the sleeve 16. To limit the heat transfer from the weld, the alignment recess 44 includes a heat shielding member 54 received therein. The heat shielding member is preferably a high temperature, high purity material, such as a ceramic tape or ceramic paper having a melting point of approximately 3200 degrees F. The heat shielding member 54 protects the sleeve 16 from direct burning by the weld and insulates the sleeve 16 from the heat generated by the weld. A ring member 28 is also received in the alignment recess 44, over the heat shielding member 54. The ring member 28 is preferably a metallic ring, which supports the spacers 30 which are used to align the pipe ends 12, 14 for welding and to properly position the sleeve 16 in the pipe ends 12, 14. However, this ring 28 also tends to transfer heat away from the weld area. To limit the heat transfer from the ring member 28 into the body of the sleeve 16, the width of the ring member 28 is preferably slightly smaller than the width of the alignment recess 44, and the insulative material preferably extends between the base and sides of the ring member 28 and the base and sides of the alignment recess 44. By isolating the ring member from direct contact with the mass of the sleeve 16, the amount of heat transferred from the weld to the sleeve 16 is reduced. This reduces the potential peak temperature experienced at the inner circumferential 42 of the sleeve 16 to a level below that which would detrimentally affect the ability of the material exposed at the inner circumferential surface 42 of the sleeve 16 to resist corrosion and/or erosion.

To further limit heat transfer from the weld, the sleeve 16 is preferably a monolithic, i.e. homogeneous, one piece member preferably formed from a thermally insulative material such as PTFE, which may be filled with fiberglass or with a composition of 20% carbon and 5% graphite, or with a mineral oil based material approved by the FDA such as wollastimite, all of which are available from EGC, Corp. of Houston Tex., or such other material having high heat stability, high abrasion resistance, low reactivity and low thermal creep. A sleeve 16 made from a PTFE or similar base material will limit the heat transfer from the weld along the sleeve outer surface, and through the sleeve 16, by an amount sufficient to protect the seals 50, 52 and the inner circumferential surface 42 of the sleeve 16 from excessive temperatures. Additionally, such a sleeve 16 material is as impervious to the fluids and gases passing through the welded connection as the internal lining of the pipe. Therefore, the sleeve 16 does not need to be separately coated as in the prior art. Although the preferred sleeve 16 configuration is a one piece homogeneous member, many of the advantages of the connection 10 construction may be used in conjunction with a metallic sleeve, such as stainless steel or a coated steel sleeve 16.

Figure 2:
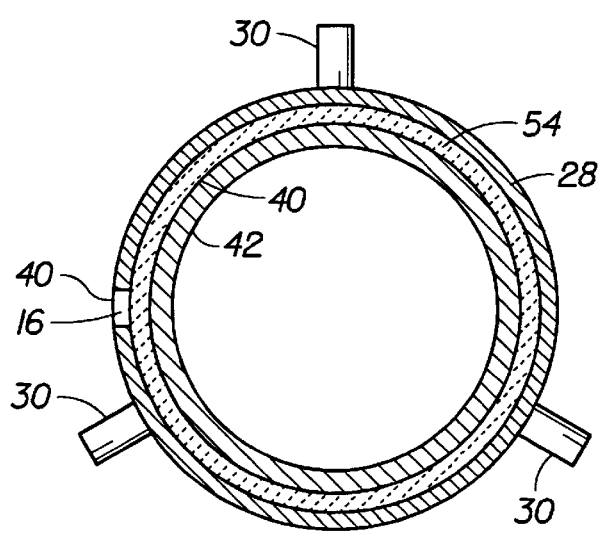
FIG. 2 is a sectional view of the connection of FIG. 1 at section 2—2.
Figure 4:
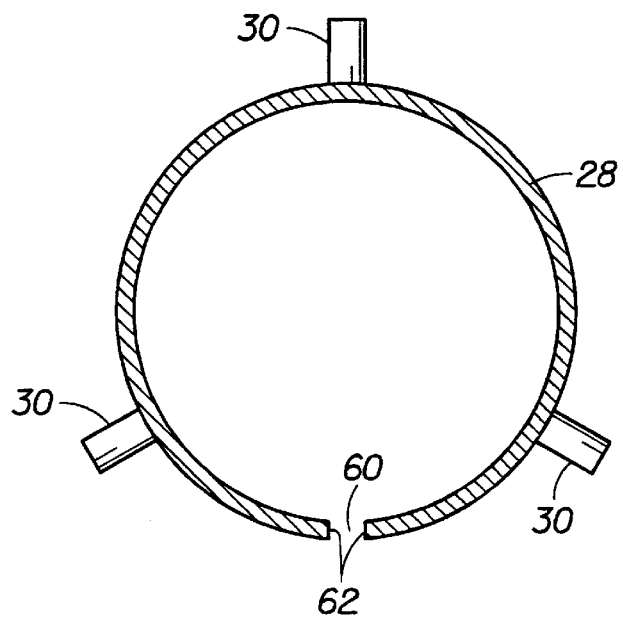
FIG. 4 is a side view of the alignment ring of the sleeve of the present invention, before assembly onto a sleeve member.

Referring now to FIGS. 2 and 4, the ring member 28 is a preferably a loop of material, formed substantially into a ring prior to being placed onto the sleeve 16. Preferably, the loop is formed from the same material as the pipe material, such as an alloy steel. The loop includes a gap 60 formed between the opposed ends 62 of the loop. When the loop is located over the sleeve 16, the opposed ends 62 are preferably tack welded together to secure the ring member 28 in the alignment recess. Alternatively, the ring member 28 may be provided with a gap which allows the ring member 28 to spring out and into contact with the inner diameter of the pipe. Thus, when the pipe ends 12, 14 are welded together, the ring 28 will become welded to the inside of the pipe ends 12, 14. When the ring member 28 is formed over the sleeve 16 by tack welding the ends 62 of the ring member 28 together, the ring member 28 becomes locked into position in the alignment recess 44. Thus, once the ring member 28 is welded in place within the pipe ends 12, 14, the sleeve 16 is then locked in place in the pipe ends 12, 14. Thus, the alignment recess 44 serves to align the ring member 28, and the spacers 30 extending therefrom, at a specific location with respect to the ends of the sleeve 16.

To prepare a pipe joint using the continuous corrosion barrier 10 of the present invention, the sleeve 16 is first prepared by compressing the split ring member 28 into the alignment recess 44 over the insulative member 54, and the ends 62 of the ring 28 are tack welded together. This may be performed on site, or the ring member 28 may be tack welded in place when the sleeve is manufactured, or at intermediate steps in between. The sleeve 16, with the seals 50, 52, the insulative member 54, and the ring member 28 thereon, is loaded into the first pipe end 12 until the spacers 30 are in contact with, or immediately adjacent, the pipe end 12. Then, the second pipe end 14 is manipulated over the sleeve until the pipe end contacts the spacers 30. At this point, the pipe ends 12, 14 arc tack welded together at multiple discrete locations between the spacers 30 without incorporating the spacers 30 into the weld. For example, if three pins are used, three tack welds are located to connect the pipe ends 12, 14 midway between the three spacers 30. The spacers 30 are then removed, preferably by hitting the portion thereof extending outwardly beyond the pipe ends 12, 14 with a hammer. Then the weld is completed in multiple passes. During the initial passes of welding, a small gap is maintained to allow air to vent from the area between the sleeve 16 and the pipe ends 12, 14, and the gap is closed during the welding process. If the sleeve 100 is used in conjunction with a cement lined pipe, the ring member 28 and the spacers 30 need not be used if the lining is properly terminated inwardly the pipe end to properly position the sleeve.

Figure 5:
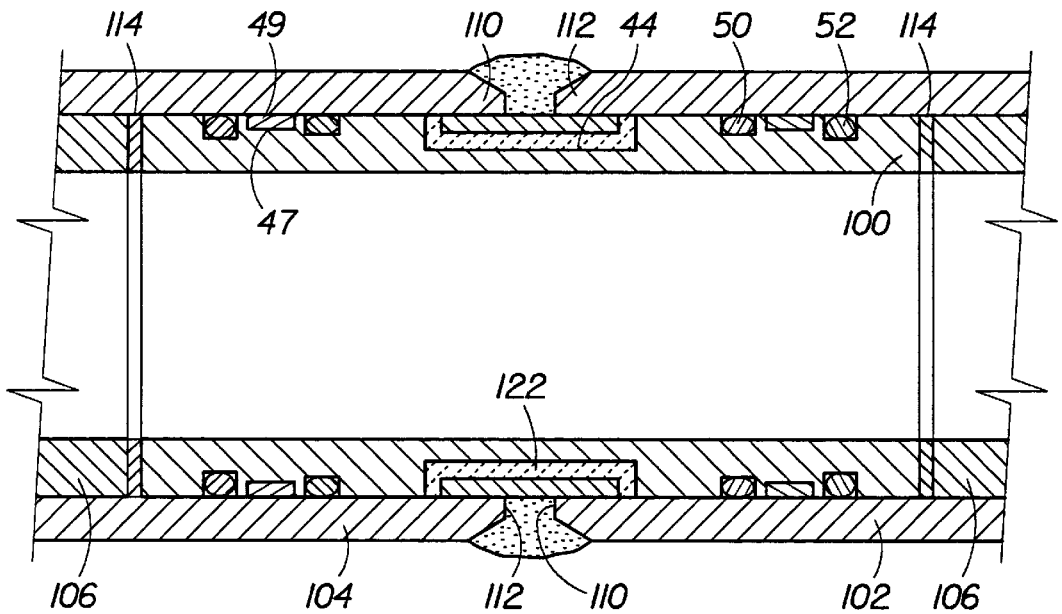
FIG. 5 is a sectional view of a further alternative preferred embodiment of the connection of FIG. 3.

Referring now to FIG. 5, an alternative embodiment of the sleeve 100 is shown. In this embodiment, the sleeve 100 is configured to be received into pipe segments 102,104 having cement linings 106, or another relatively thick lining. The sleeve 100 is identical to the configuration of sleeve 16, except as specifically noted herein. The cement lining 106 is supplied from the pipe supplier, and is set back a specific distance from the ends 110, 112 of the pipe segments 102, 104. The setback distance corresponds to the distance which the sleeve 100 extends inwardly into the pipe ends 110, 112, Such that a space will remain between the ends 110, 112 of the pipe when the sleeve 100 is fully received in the pipe ends 110, 112, which space corresponds with the gap between the pipe ends which is necessary for a proper weld.

To ensure that the weld is not exposed to the pipe fluids or gases, seal rings 114 are located between the ends of the sleeve 100 and the ends of the cement lining 106 within the pipe ends 102, 104.

When combined with cement coated pipe, the sleeve 100 of the present invention does not require the spacers 30, because the cement lining 106 within the pipe 102, 104, in cooperation with the sleeve 100, establishes the required gap between the pipe ends 110, 112 for welding. Additionally, the ring member 28 need not be used, because the ends of the cement lining maintain the sleeve 100 in position in the longitudinal direction of the pipe 102, 104. However, the alignment recess 44, and an insulative member 54 therein, are necessary to limit direct heat transfer from the weld into the sleeve 100. Therefore, a ceramic or other insulative member 54 is received in alignment recess 44 to protect the sleeve 100 from direct burning from the weld and to insulate the sleeve 100 from the heat generated from the weld. The member 54 may be configured as a wrap or wraps of silica cloth, which is placed within the recessed area 44, or the material may be adhered to the sides of the recessed area 44, and formed to leave an air gap 122 between the insulative member 54 and the weld. Alternatively, the ring member 28 and the spacers 30 may be used with a cement lined pipe, but so long as the cement lining terminates within the pipe 102, 104 at a proper distance to properly align the sleeve 100 in the pipe 102, 104, the ring member 28 and the spacers 30 are redundant.

Figure 6:
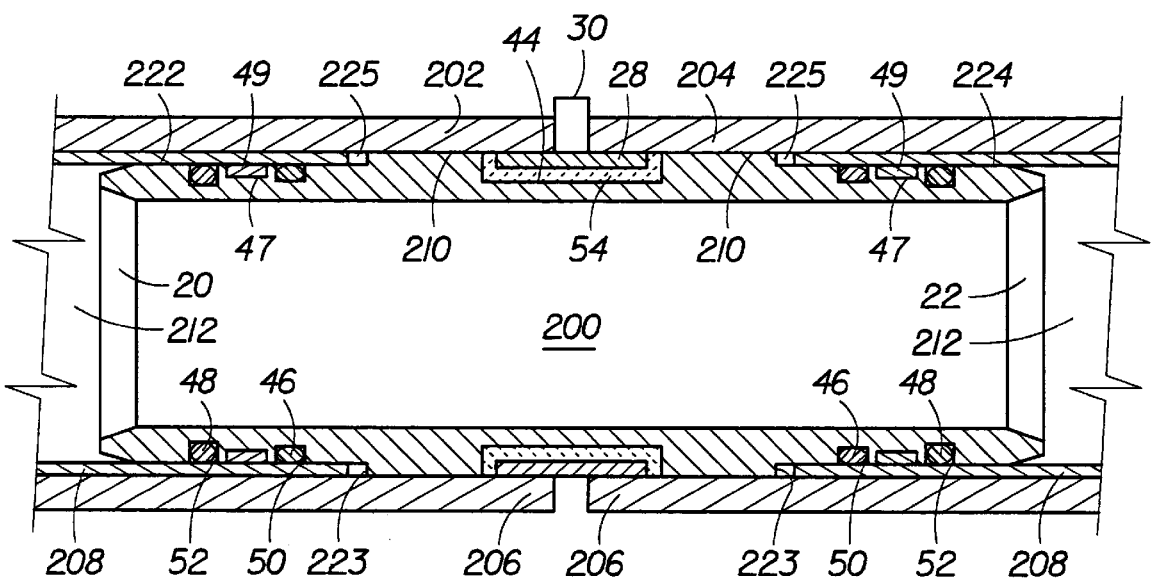
FIG. 6 is a sectional view of an additional preferred embodiment of the present invention in a welded connection.
Figure 7:
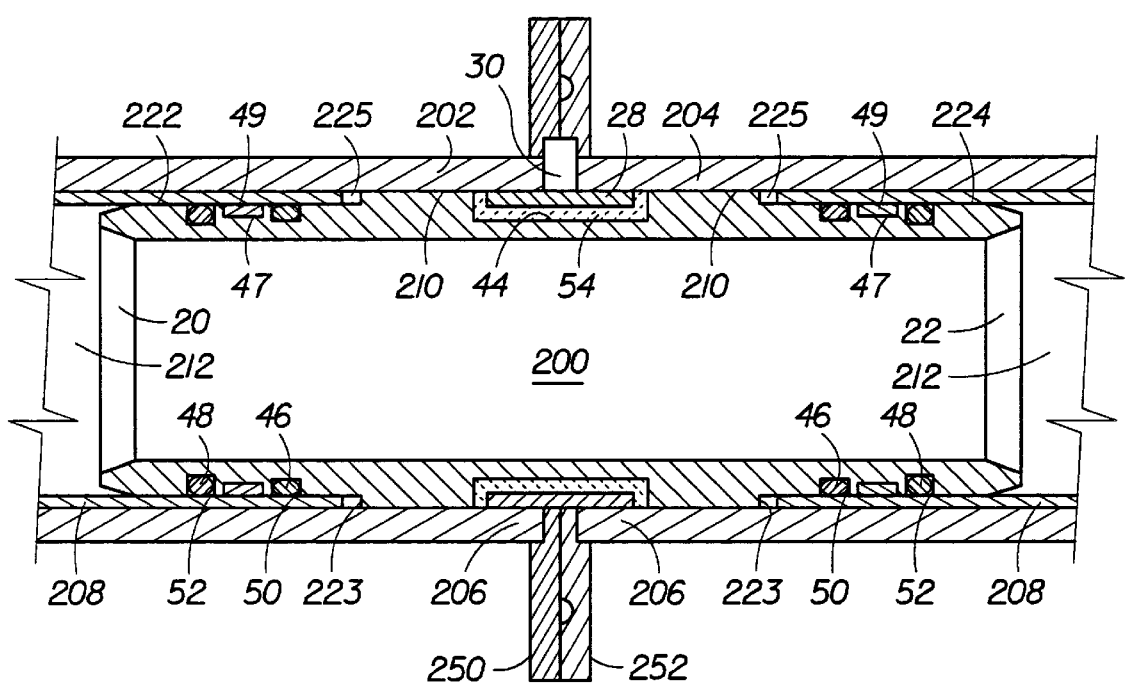
FIG. 7 is a sectional view of the sleeve of the additional preferred embodiment of the present invention in a flange connection of adjacent pipe ends.

Referring now to FIGS. 6 and 7, a further alternative embodiment of the continuous corrosion barrier 10 of the present invention generally includes a sleeve 200 which is received in the adjacent ends 202, 204 of adjacent lengths of 20 an internally sleeved pipe 206. The internally sleeved pipe 206 includes a tubular barrier 208 disposed between the metallic body 210 of the pipe 206 and the internal flowway 212 Of the pipe 206. This tubular barrier 208 provides corrosion protection for the interior wall of the pipe 206 where highly corrosive or erosive materials are present. One typical tubular barrier 208 material is a PTFE type material sold by DuPont Corporation under the trade name Tefzel. This material, or a similar material, is commonly used in chemical plant pipe applications, where highly erosive or corrosive fluids such as gases, liquids, or slurries are flowed through the pipe. The sleeve 200 is in all respects identical to the above described sleeve 16, including, but not limited to, the materials used in the construction of the sleeves 16 and in the spacers 30, except the opposed open ends 20, 22 of the sleeve 200 include recesses 222, 224 which form minor diameter portions at each end of the sleeve 200 which are received within the tubular barrier 208 within the pipe. Where the sleeve 200 is used in conjunction with a welded connection as shown in FIG. 6, the central shielding portion 24 of the sleeve 200 preferably includes the ring member 28 received over a heat shielding member 54 in an alignment recess 44 as in sleeve 16, having a plurality, preferably three to six, of alignment spacers 30 circumferentially spaced thereabout and extending outwardly therefrom. The spacers 30 are preferably attached to the ring 28 by tack welding, although other attachment means, such as forming the connection of the spacer 30 to the ring 28 as a rivet, or as a simple mechanical connection capable of being easily broken, may be provided. When the sleeve 200 is properly positioned in the pipe ends 12, 14, the pipe ends 12, 14 contact, or are in close proximity to, the spacers 30. Preferably, the spacers 30 are configured as pins, which extend outwardly from the outer diameter of the pipe, or may be configured as spherical balls. As with the sleeve 16, the spacers are preferably removable, so as to space apart the pipe ends for welding, but not be incorporated in the weld joining the pipe ends. However, it has also been found that the spacers need not be used in all applications, because the tubular barrier 208 material may prevent the sleeve 200 from moving laterally within the pipe, i.e., the sleeve 200 will remain locked in place within the pipe. However, because the tubular barrier 208 expands and contracts within the pipe, the sleeve 200 may move slightly within the pipe 206 unless the weld connection is attached to the ring 28.

The recesses 222, 224 adjacent each of the ends 12, 14 of the sleeve 200 preferably include the pair of seal grooves, 46, 48 as in the sleeve 16, which are disposed in the recesses 222, 224, and are also preferably disposed as pairs of seal grooves 46,48 such that a seal groove 46 or 48 is located on either side of, and equidistant from, the alignment recess 44. Each of the recesses 222 or 224 terminates inwardly of the sleeve end 22 or 24 in an annular ledge 223, which, in combination with the surface of the recesses 222,224, define a minor diameter portion on each end of the sleeve 200. The inboard seal groove 46 has a first depth to accommodate a first seal 50 such as an O-ring therein. The first seal 50 is preferably a high temperature seal configured from a high temperature material, such as silicone, capable of withstanding a temperature of approximately 300 degrees Fahrenheit. The second groove 48 is positioned between the first groove 46 and the adjacent end 20 or 22 of the pipe, and is sized at a second depth, greater than that of the first groove 46, to receive a second seal 52 such as an O-ring therein. The second seal 52 may be a buna material capable of withstanding temperatures on the order of 150 degrees Fahrenheit. The seals 50, 52 preferably have the same cross section, and therefore the first seal 50 will extend further from the recesses 222, 224 of the sleeve 16 than will the second seal 52 prior to insertion of the sleeve 16 into the pipe end 12 or 14. Typically, the first seal 50 should be received in a first seal groove 46 having a groove depth of 0.060 inches, and the second seal 52 should be received in a groove 48 having a depth of 0.080 inches, where the seal has a nominal thickness of 0.125 inches. Also, the highest compression set of the seal is preferably about 25%. If the sleeve 16 will be exposed to high pressures within the pipe, backup rings may be provided in the grooves 46,48. These rings are preferably configured from a high temperature conformable material such as Viton. The grooves 46, 48 are spaced a sufficient distance from the weld to ensure that the temperatures at the seals 50, 52 disposed therein do not exceed the limit temperatures of the material used in the seal 46 or 48.

The recesses 222, 224 are sized such that the outer diameter of the sleeve 200, at the recesses 222, 224, is slightly smaller than the inner diameter of the tubular barrier 208 maintained within the sleeved pipe 206. Thus, the outer diameter of the second seal 52 in the recesses 222, 224 will be at one end of the tubular barrier 208 inner diameter tolerance, and the outer diameter of the second seal 52 will be sized at the other end of the tubular barrier 208 inner diameter tolerance. Typically, the tubular barrier material conforms to the inner diameter of the pipe, so that the tolerance range that the seal 46,48 must span is based on the tolerance of the pipe 206 plus the tolerance on the wall thickness of the tubular barrier 208. To place the sleeve 200 in the adjacent ends of the pipe 206, the tubular barrier 208 is cut off within the pipe at a distance from the pipe end slightly greater than the length of the recesses 222, 224 on the sleeve 200, and the sleeve 200, with the O-rings 50, 52 thereon, is inserted into the ends of the sleeved pipe 206. Alternatively, the tubular barrier 208 may be supplied terminated inwardly of the pipe end 202, 204. By providing the depth of the cut off of the tubular barrier 208 inwardly of the adjacent end 202 or 204 of the pipe 206 as slightly greater than the length of the recesses 222, 224, a small gap 225 may be provided between the annular ledge 223 of the sleeve 200 and the end of the tubular barrier 208 at ambient temperatures. This gap 225 allows for thermal expansion of the tubular barrier 208 material when hot fluids are passed through the pipe, without the sleeve 200 or tubular barrier 208 becoming excessively compressively loaded.

To prevent corrosion caused by aerobic or anaerobic bacteria, the present invention provides for a recess 47 disposed between the first and second O-ring grooves 46 and 48. A bacterial protection material 49, such as a biocide or a combination of biocide and inhibitors, is disposed in the recess. If any fluid containing corrosion causing bacteria leaks into the area between the second seal and the first seal, the bacterial protection material 49 blends with the fluid and terminates any bacterial activity before bacteria can reach unprotected steel and cause corrosion. Any biocidal composition or material may be used in accordance with the present invention. Biocides such as iodine/iodides finction by attacking the outer cell wall of the microorganisms, such as bacteria and viruses, resulting in their destruction. The biocide material may be provided as a biocide carrying resin or other biocidic media. To enhance corrosion protection, the bacterial protection material may also contain additional corrosion inhibitors other than biocide. The bacterial protection material is preferably in a form which is soluble with any fluid material that is transported through the pipeline.

Once the sleeve 200 is positioned in the pipe ends 202, 204, the pipe ends 202, 204 may be welded together, as described herein for the connection 10 using the sleeve 16, i.e., using the spacers 30, or as described herein using the sleeve 100 where the spacers are not used in conjunction with the sleeve 200, to complete the connection. Additionally, as shown in FIG. 7, the connection of the pipe ends 202, 204 may be provided by welding flanges 250, 252 to the pipe ends 202, 204 before the connection is made, and then joining the pipe end at the flange with mechanical means such studs and nuts, clamps, and the like. In this configuration, the spacers 30 may be used to center the sleeve 200 within the pipe ends, or, the spacers may be removed, so long as the pipe includes a barrier material such as tubular barrier 208, or another internal member, that is capable of preventing substantial lateral movement of the sleeve 200 from the connection of the pipe ends at the flanges.

The structure of the sleeve 200 provides substantial benefit to pipe line applications, such as pipe runs in chemical plants or refineries, because it eliminates the need for the flanged connection of the pipe 206 and the inner barrier material 208. By eliminating the flanged connection, and instead welding the pipe ends 202 together, the costs of flanging the pipe 206 and flaring the ends of the barrier 208 are eliminated. Likewise, the elimination of the flanged connection, fugitive emissions from the pipe connection are eliminated. Further, by eliminating the flange connection, and instead cutting the barrier 208 off inwardly of the pipe ends 202, 204, the loading of the tubular barrier 208 from thermal cycling is substantially eliminated. This permits the use of longer pipe lengths, because the barrier 208 may expand linearly within the pipe 206 up to the size of the gap 225 between the annular wall 223 on the sleeve 200 and the end of the barrier 208 without risk of failing the barrier 208. Additionally, the use of the sleeve 200 eliminates the failure point in the tubular barrier 208 existing at the flared corner needed in the prior art, thus increasing the reliability of the connection. Finally, the sleeve 200 may be used in conjunction with a flanged connection. and still provide the improvements in the reduction of theririally induced stresses in the barrier 208. Where the sleeve 200, or the sleeves 16, 100, are used in conjunction with flanged pipe, the spacers 30 need not be provided, but over means, such as the inner barrier 200, must be present to prevent the sleeve 200 from moving within the pipe by a distance sufficient to expose the area of the pipe adjacent the flange. Additionally, where the connection is flanged, rather than welded, the heat stability of the sleeve 200 and seal 46, 48 materials is not as critical as in a welded connection, because the connection will not be exposed during use to temperatures approaching those encountered when the pipe ends are welded. Therefore, it is possible, in these circumstances, to provide the sleeve 200 without the heat resistant material 54 and build the sleeve 200 from materials having lower thermal resistance, which further simplifies the manufacture and assembly of the sleeve 200. These modifications to sleeve 200 may also be used, in conjunction with sleeve 100, and sleeve 16, where the connection is not welded. It is even contemplated that the spacers 30 of the sleeve 16 may be placed between the flanges, to secure the sleeve in the pipe ends 20, 22.

The sleeves 16, 100 and 200 provided herein provide a continuous corrosion barrier at the weld joint joining adjacent pipe ends 12, 14, pipe ends 110,112 or pipe ends 202, 204. In one embodiment of the invention, the sleeves 16,100 and 200 are integrally non-corrosive and therefore need not be separately coated with a protective barrier to prevent corrosion or erosion thereof. Additionally, the sleeves 16, 100 and 200 may be used without the risk of affecting the weld by the sacrificing of alignment loss, i.e., the spacer 30, material into the weld. Further, the portion of the protective coating on the inside of the pipe ends 12,14, or the barrier 208, which would be burned or otherwise modified by the heat of welding to the point where it loses its protectiveness is limited to the areas protected by the seals 50,52, and the inner diameter of the sleeve 16, 100,200 is not adversely affected by the weld heat where the sleeve 16,100 or 200 is a solid insulative member. Further, because the edges of the ring member 28 are isolated from the sleeve 16 by the insulative member 54, the quantity of the weld heat which actually transfers to the inner diameter of the sleeve is reduced. Therefore, if the sleeve 16,100 or 200 is a coated metallic member, the inner coating of the sleeve 16,100 or 200 is far less likely to be affected by the weld heat. Where the sleeves 16,100 or 200 are configured as solid insulative members, such as from PTFE, they may be used without deleterious effect even if they are cut or nicked, because no base metallic material can be exposed as would occur with the prior art coated metallic sleeves. Further, where the sleeve 16, 100 or 200 is non-metallic, a magnetic inspection pig may more easily inspect the pipe and weld area, because no secondary metallic barrier extends over the weld. Finally, the multiple seal arrangement ensures that the sleeves 16, 100 or 200 will protect the weld area irrespective of the size of the pipe within each pipe size tolerance.

Preferably, the sleeve 16, 100 or 200 has greater elasticity than the outer pipe material, so that the sleeve 16, 100, or 200 will expand to further seal against the inner wall of the pipe when materials are flowed, under pressure, through the pipe. Preferably, the sleeve 16, 100 or 200 is configured as a unitary piece of a material such as PTFE, although an elastic core member, having a PTFE or similar layer thereover, is specifically contemplated. Where the sleeve 16, 100 or 200 is made of PTFE, and the pipe is configured from steel, it has been found that the sleeve will physically deform outwardly against the pipe inner diameter when pressurized materials are flowed through the pipe. For example, where the thickness of the sleeve 200 is approximately 0.300 inches thick, and at the recesses 222, 224 is approximately 0.210 inches thick, the pressure within the pipe may be sufficient to radially expand the sleeve 200 outwardly to seal against the inner diameter of the pipe 206 and the barrier 208. At the end of the sleeve 200, this sealing provides a third seal area, in addition to the seal rings 46, 48, to ensure that a continuous corrosion barrier is formed at the connection of the two adjacent pipes 206. However, the seals 52,54 should still be used to seal the connection, to provide sealing during the period of time when the connection is at low pressures, such as the initial use of the pipe or when low pressure fluids are flowed therethrough. Additionally, by providing a wall thickness on any of the sleeves 16,100,200 described herein, the sleeve itself may be used to provide additional sealing area at the weld or other connection of the pipe ends.

Although the preferred embodiments of the invention have been described embodying multiple features of the invention, each of the individual features of the invention may be used separately, or concurrently, to provide improvements in the connection of pipe ends 12,14. For example, the ring member 28 may be configured of non-metallic members, or the spacers 30 may extend through the ring member 28, and be semi-permanently affixed to the sleeve. The ring may also be formed from a material having low thermal conductivity which, when coupled against a ferrous material such as the pipe, does not create a galvanic reaction but is attachable to the weld. In such circumstance, the ring member 28 may be embedded in the sleeve 16, or integrally formed therein.

While the foregoing is directed to the preferred embodiment of the present invention, other and further embodiments of the invention may be devised without departing from the basic scope thereof, and the scope thereof is determined by the claims which follow.

What is claimed is:

1. An apparatus for providing corrosion protection for welded pipe interconnections, comprising:
    a) a cylindrical, corrosion resistant sleeve having an outer surface and opposed first and second ends;
    b) a bacterial protection material disposed on the outer surface intermediate the first and second ends;
    c) a first circumferential recess disposed intermediate the opposed ends and aligned at the weld connection; and
    d) an insulative member disposed within the recess.

2. The apparatus of claim 1 further comprising:
    c) a first seal disposed on the outer surface intermediate the first end and the bacterial protection material; and
    d) a second seal disposed on the outer surface intermediate the second end and the bacterial protection material.

3. The apparatus of claim 1 wherein the bacterial protection material is disposed within the recess.

4. The apparatus of claim 2 wherein the bacterial protection material is disposed within the recess.

5. An apparatus for providing a corrosion resistant barrier at a welded connection of lined pipe, comprising:
    a) a corrosion resistant sleeve member comprising inner and outer surfaces, opposed first and second ends, and a first circumferential recess disposed intermediate the opposed ends and aligned at the weld connection;
    b) an insulative member disposed within the recess;
    c) a first portion of bacterial protection material disposed on the outer surface of the sleeve, between the recess and the first end; and
    d) a second portion of bacterial protection material disposed on the outer surface of the sleeve, between the recess and the second end.

6. The apparatus of claim 5, further comprising:
    f) a second circumferential recess disposed on the outer surface of the sleeve between the first recess and the first end, wherein the first portion of bacterial protection material is disposed within the recess; and
    g) a third circumferential recess disposed on the outer surface of the sleeve between the first recess and the second end, wherein the second portion of bacterial protection material is disposed within the recess.

7. The apparatus of claim 5, further comprising:
    h) a first pair of seals disposed on both sides of the first portion of bacterial protection material; and
    i) a second pair of seals disposed on both sides of the second portion of bacterial protection material.

8. The apparatus of claim 5 further comprising a plurality of removable pins extending from the metal ring.

9. The apparatus of claim 1, wherein the cylindrical, corrosion resistant sleeve is selected from a polymer monolith, stainless steel and coated steel.

10. An apparatus for providing a continuous corrosion barrier for interconnections of adjacent sections of pipe, each pipe section having a corrosion resistant liner therein, comprising:
    a) a sleeve having a cylindrical outer surface, a cylindrical inner surface, and opposed first and second ends, said cylindrical outer surface having at least a first minor diameter portion extending inwardly of said outer cylindrical surface and extending along said outer cylindrical surface inwardly of said end;
    b) a first seal extending circumferentially about said first minor diameter portion;
    c) a second seal extending circumferentially about said first minor diameter portion intermediate of said first seal and said first end;
    d) said first seal extends a first height from said first minor diameter portion and said second seal extends a second height from said first minor diameter portion, said first height exceeds said second height;
    e) said minor diameter portion received within the inner diameter of the internal barrier in the pipe and at least one of said first seal and said second seal engaging the inner diameter of the internal barrier; and
    f) a bacterial protection material disposed on the outer surface intermediate the first seal and the second seal.

11. The apparatus of claim 10 further comprising a recess disposed on the outer surface intermediate the first and second seals, wherein the bacterial protection material is disposed within the recess.

12. The apparatus of claim 10, wherein said first seal extends a first height from said first minor diameter portion and said second seal extends a second height from said first minor diameter portion, said first height exceeds said second height.

13. The apparatus of claim 10, wherein the cylindrical, corrosion resistant sleeve is selected from a polymer monolith, stainless steel and coated steel.

14. The apparatus of claim 1, wherein the bacterial protection material contains an antibacterial agent.

15. The apparatus of claim 1, wherein the bacterial protection material contains a biocide.

* * * * *